Sept. 27, 1960 N. HOGLUND 2,953,975
APPARATUS FOR MOVABLY SUPPORTING, INDEXING, AND
POSITIONING A WORK PIECE
Filed Jan. 13, 1956 7 Sheets-Sheet 1
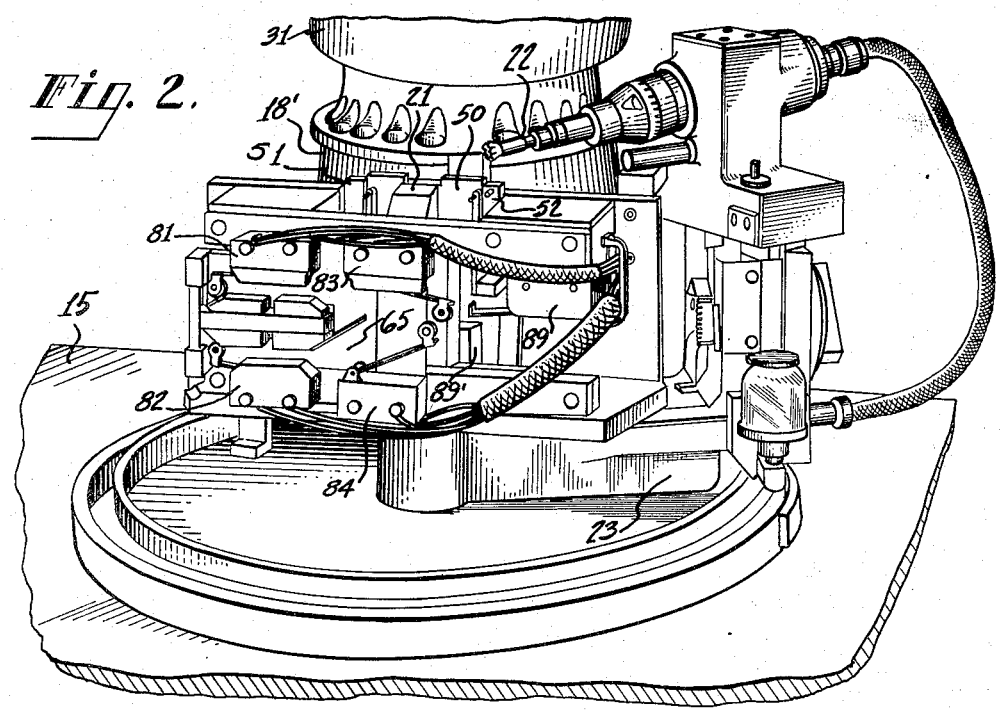
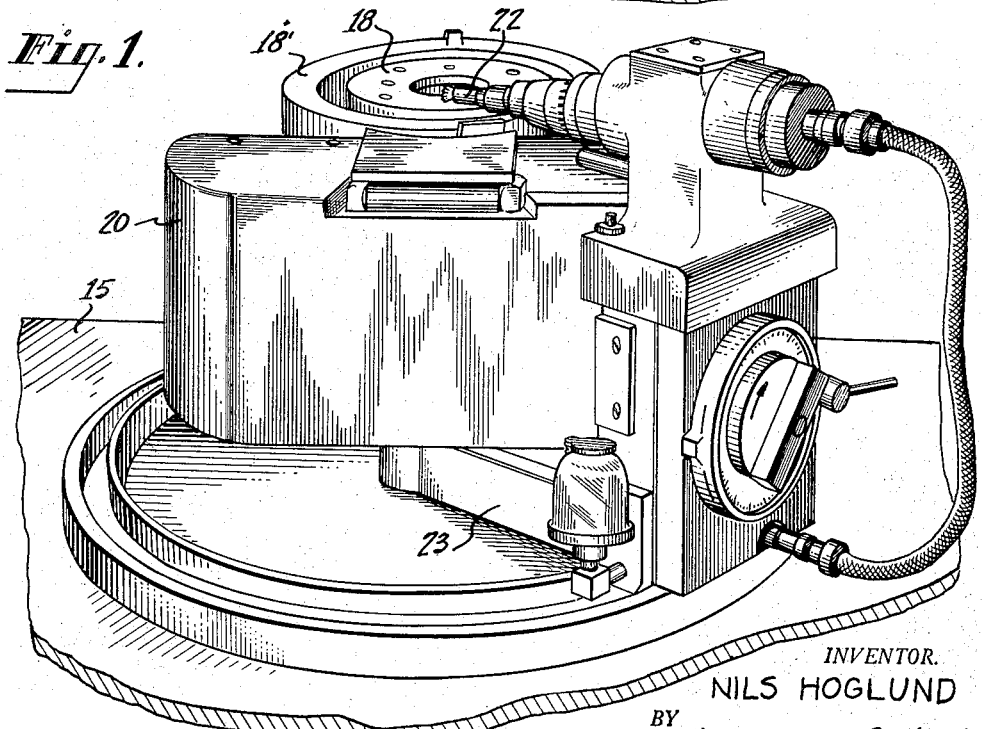
INVENTOR.
NILS HOGLUND
BY William A. Zalesak
ATTORNEY

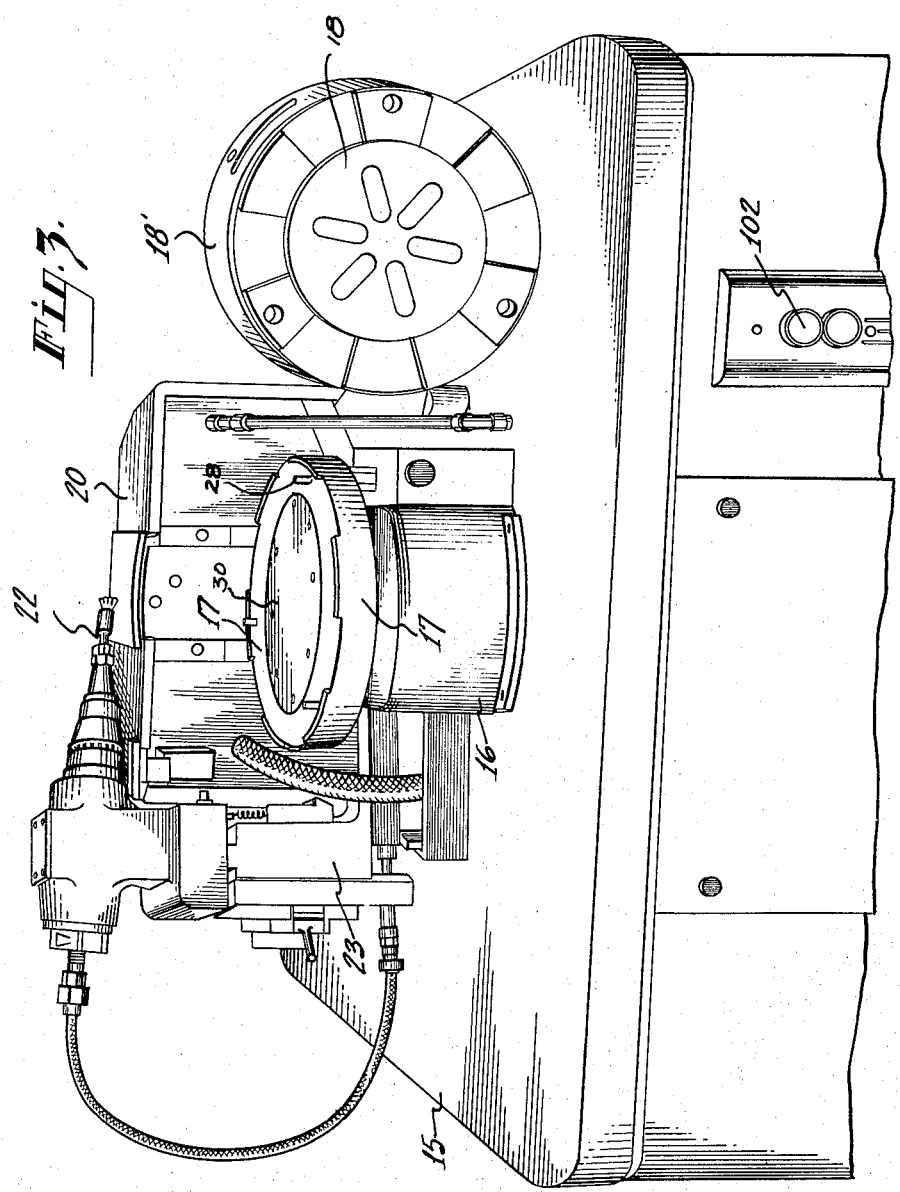

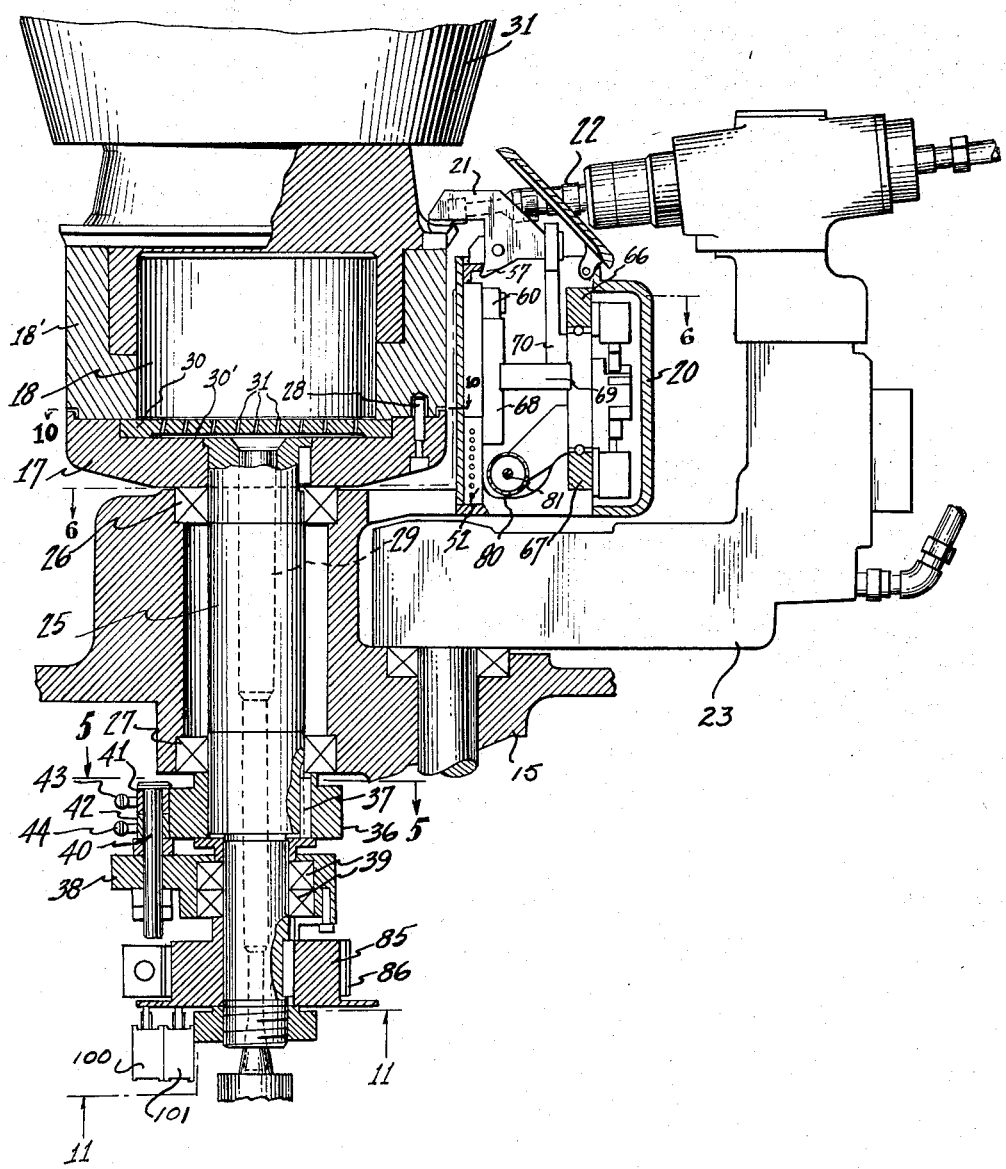

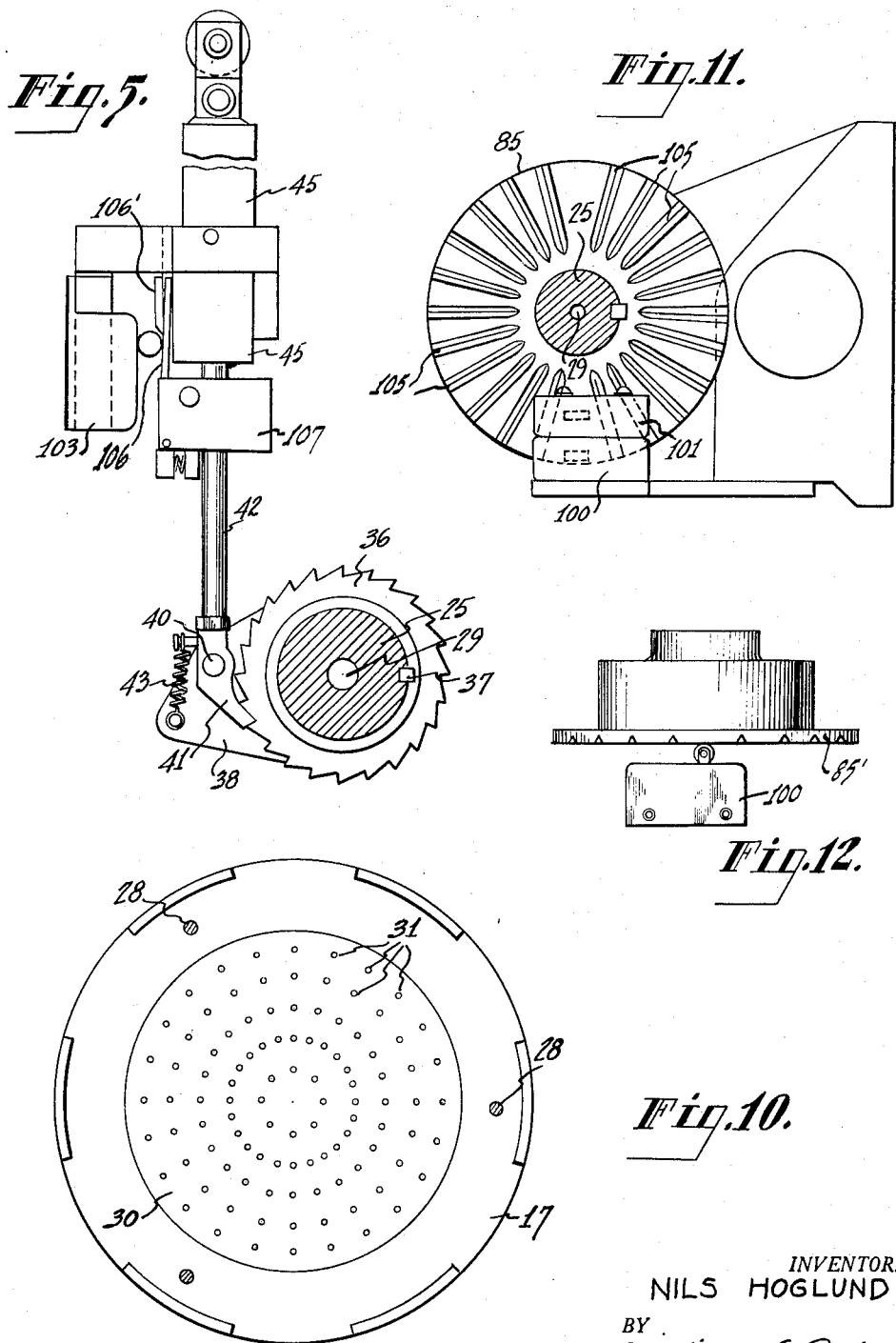

Sept. 27, 1960 N. HOGLUND 2,953,975
APPARATUS FOR MOVABLY SUPPORTING, INDEXING, AND
POSITIONING A WORK PIECE
Filed Jan. 13, 1956 7 Sheets-Sheet 5
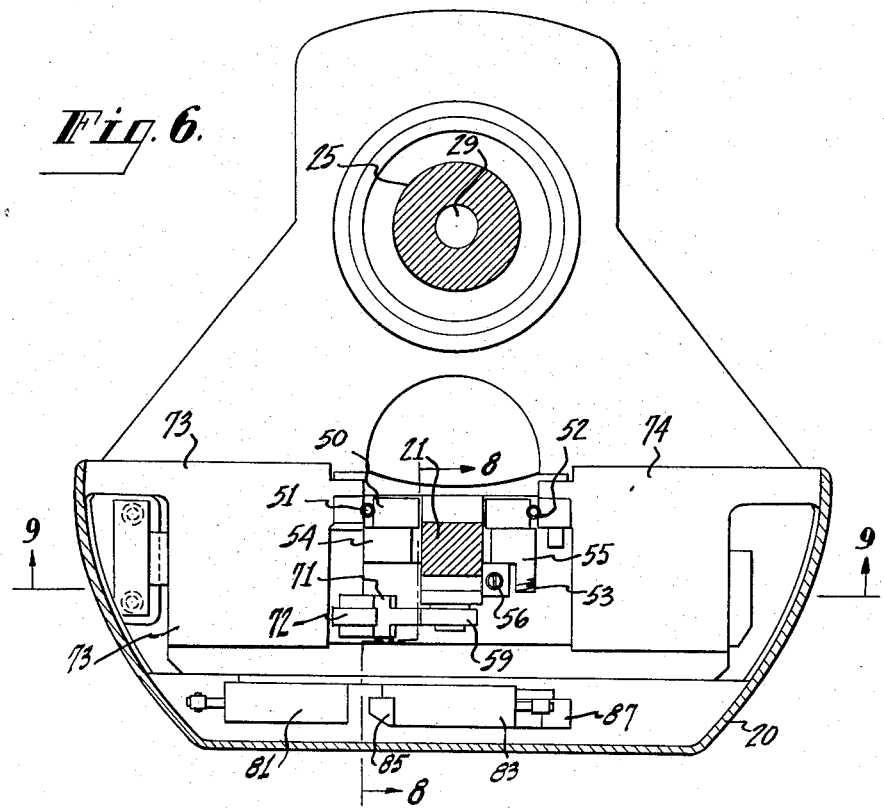
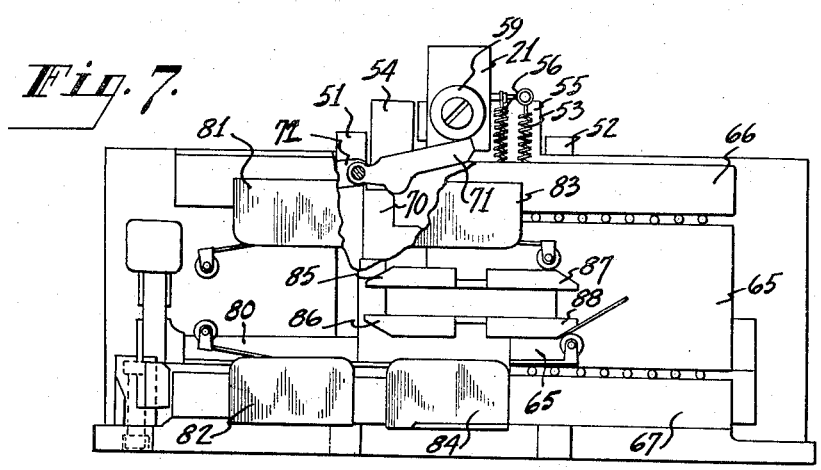
INVENTOR.
NILS HOGLUND
BY
William A. Zalesak
ATTORNEY

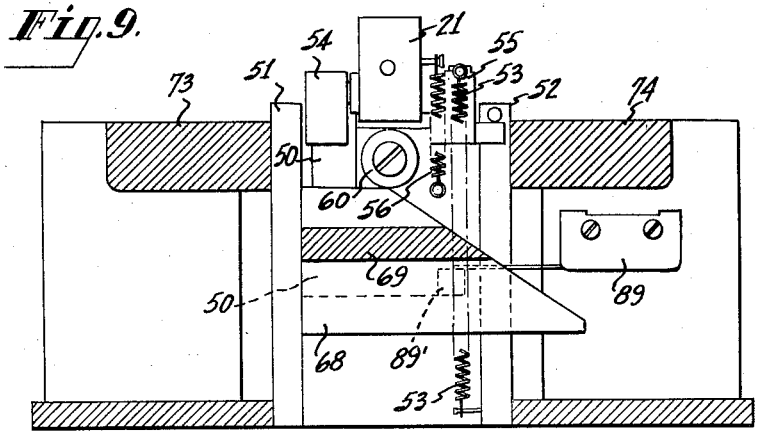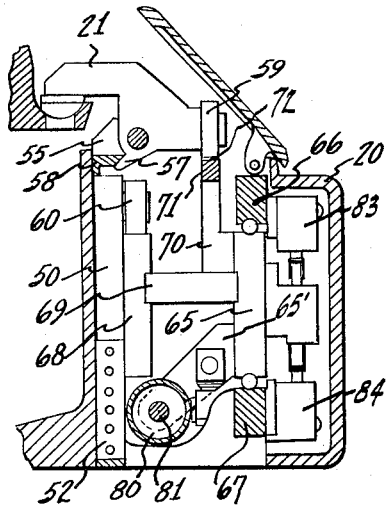

INVENTOR.
NILS HOGLUND
BY
William A. Zalesak
ATTORNEY

United States Patent Office 2,953,975
Patented Sept. 27, 1960

2,953,975
APPARATUS FOR MOVABLY SUPPORTING, INDEXING, AND POSITIONING A WORK PIECE

Nils Hoglund, 7 Webster Ave., Summit, N.J.

Filed Jan. 13, 1956, Ser. No. 558,910

12 Claims. (Cl. 90—56)

My invention relates to an apparatus for movably supporting, indexing and positioning a work piece precisely and accurately, and is particularly useful for machine tool equipment such as millers, drillers, and like apparatus.

In one type of operation for milling machine bolt holes in cylinder heads it is necessary to rotatably index the cylinder head or work piece so that different and successive bolt holes are indexed to the tool position. Since the bolt holes are not equally spaced either from the axis or from each other, it is necessary to move the bolt hole into position to be operated upon after the indexing takes place. This requires a support means which is movable and which also provides a floating connection with the work piece to permit movement of the work piece in all directions relative to the support during the positioning operation.

In accordance with my invention, I provide a rotatable support having a magnetic chuck for supporting and holding a work piece, in this case, a cylinder head. Mechanism is provided for indexing the cylinder head to different successive positions. The magnetic chuck is separable from the supporting member and has a floating connection therewith. The chuck is mounted on a plurality of pins extending into oversize holes within the chuck. The rotatable support and chuck are so constructed that air under pressure can be admitted beneath the chuck to float it and the work piece in space. A slide mechanism is provided adjacent the chuck having a pivoted positioning finger or so-called block lock which is moved into position after the work piece has been indexed. At a predetermined instant the locating or positioning finger engages the bolt hole and moves the work piece, while floating, into a precisely located position. The air is then shut off and the chuck returns to a fixed connection with the rotatable support. Operation of the indexing mechanism and slide mechanism supporting the positioning finger is accomplished by fluid pressure operated pistons solenoid controlled and the air supply by a solenoid operated valve all of which are electrically controlled by switches located on the indexing mechanism, the rotatable support and the slide mechanism so that the various operations are performed in proper sequence.

Further objects of the invention will appear in the following description with reference to the drawings, in which:

Fig. 1 is a perspective view of an apparatus made according to my invention without a work piece in place;

Fig. 2 is a perspective view with the cover removed showing details of the slide mechanism;

Fig. 3 is a perspective view of the reverse side of Fig. 1;

Fig. 4 is a vertical section of the apparatus shown in Figs. 1, 2, and 3;

Fig. 5 is a transverse action of the rotatable support and indexing mechanism taken along the line 5—5 of Fig. 4;

Fig. 6 is a transverse section taken along the line 6—6 of Fig. 4;

Fig. 7 is a front elevation of Fig. 6 with parts broken away to show details of construction of the block lock slide mechanism;

Fig. 8 is a transverse vertical section taken along the line 8—8 of Fig. 6;

Fig. 9 is a vertical section taken along the line 9—9 of Fig. 6;

Fig. 10 is a transverse section taken along the line 10—10 of Fig. 4;

Fig. 11 is a transverse section taken along the line 11—11 of Fig. 4;

Fig. 12 is a side elevation of Fig. 11; and

*General description*

Figure 13:
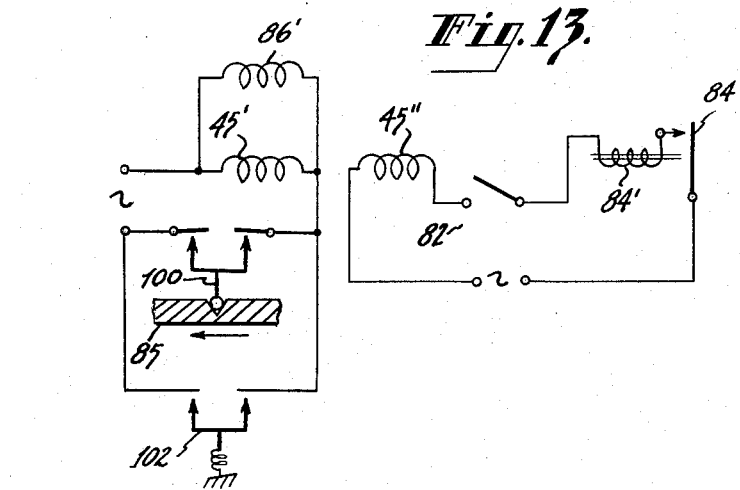
Figs. 13, 14 and 15 are schematic diagrams of the controls and circuits used with the apparatus shown in the other figures.

Referring now to Figs. 1, 2, and 3, a table 15 supports the housing base 16 on which is mounted a rotatable platen 17. Mounted on the rotatable platen in 17 is a magnetic chuck 18 and the housing cylinder mounting 18'. The magnetic chuck 18 and cylinder mounting 18' are movable axially and transversely of the platen 17 in a manner to be described. An indexing mechanism to be described is connected to rotate the platen and chuck through predetermined angles to present the work piece in a predetermined position with respect to the working tool.

The cylinder block lock mechanism or positioning finger 21 for accurately positioning and registering the work piece is mounted within housing 20. This block lock 21 is movably supported in the housing 20 and engages the cylinder block and work piece in a manner to be described to accurately position the bolt hole. When the block lock engages and positions the work piece, the milling tool 22 is moved into position to dress the bolt hole. The milling tool 22 is mounted on a rotatable cutter arm 23. The tool and its support do not form a part of the present invention.

When the chuck has been rotated to the proper position, the slide mechanism carrying the block lock will have moved the block lock to ready position. Controls on the rotatable support actuate the air valve to release air under pressure to lift the chuck and work piece. At the same time, other controls cause the slide, which has been stopped in ready position, to continue its movement to force the block lock or indexing finger into contact with the work piece. A portion of the slide mechanism then contacts other controls for releasing the air and for returning the slide, block lock and indexing mechanism to initial position. The milling tool is then moved into place to perform its milling operation.

*Platen support and indexer*

As best seen in Figs. 3, 4, 5, and 10, the rotatable platen 17 and chuck assembly 18 and 18' are rotatably supported on a hollow shaft 25 mounted in bearings 26 and 27. The chuck assembly is mounted on three pins 28 and can move vertically and to a limited degree transversely of the platen 17 when air under pressure is directed up the passageway 29 in shaft 25 through an air release plate 30 having a recess 30' and a plurality of small holes 31. Air is directed against the bottom of the chuck 18. When the chuck 18 is lifted, air can escape between the platen 17 and the chuck 18. However, in this position, the chuck 18 and work piece, that is, the cylinder block 31, are floating with respect to the support and platen 17. The chuck and work piece while thus floating can be easily moved to very accurately determined positions.

To rotate the platen and work piece from one index positon to another, I employ a ratchet mechanism, which is hydraulically operated and solenoid controlled. The indexing mechanism is set into operation in a manner to be described and travels from an initial to a terminal position during which process it moves the platen and work piece one position. In its travel forward and hydraulically operated pawl assembly initiates the operation of the slide which controls the indexing finger. These controls and operation will be described below.

The indexing assembly includes a ratchet 36 fixed to the shaft 25 by key 37. Below the ratchet 36 is rotatably supported housing bearing 38 on bearings 39. A pin 40 extends through the housing bearing 38. Pawl 41 and the piston arm 42 are pivotally mounted on the pin 40 and springs 43 and 44 maintaining the pawl 41 in contact with the ratchet 36 and piston arm 42 and bearing 38 in proper relationship. Piston 42 is received in cylinder 45 which is hydraulically operated. Thus, in moving from its initial to its terminal position and back again, the work piece is rotated one index position.

At the lower end of shaft 25 is mounted the friction wheel 85 cooperating with the brake 86. This is used to prevent turning of the platen and work piece in indexed position. It may be solenoid operated to release the brake whenever the indexing mechanism is energized.

Cylinder block lock assembly

Reference is now had to Figs. 2, 6, 7, 8 and 9. Mounted adjacent the rotating supporting member and platen 17 is the cylinder block lock assembly mounted within the housing 20. The block lock mechanism includes two slides, one of which moves vertically and on which is pivotally mounted the positioning finger which contacts the work piece to move it into its final position. The second slide mounted for horizontal movement is positioned adjacent the indexing finger slide and carries a cam contacting a cam follower on the indexing finger slide for causing movement of the indexing finger slide in a vertical direction. The second slide also carries four cams which actuate control micro switches mounted at the ends of the housing frame in which the slides move. Another micro switch is located in the housing and is actuated by the vertically movable indexing finger slide to control operation of the horizontally movable slide.

In operation, as the horizontally movable slide moves from its initial position, it causes vertical movement of the indexing finger slide to a ready position where it is stopped momentarily by one of the switches. When the rotating support and platen reach index position, they automatically stop and simultaneously energize the air supplied for the magnetic chuck and cause further movement of the horizontal slide to a terminal position during which the indexing finger is moved home into contact with the work piece to position it. When the slide reaches terminal position, it operates the two micro switches at this position to shut off the air and return both the horizontally movable slide and the pawl to initial position. When the horizontally movable slide returns to initial position, it actuates two other micro switching devices to stop movement of the slides and of the pawl operating mechanism in initial position.

The block lock or indexing finger 21 is pivotally supported on a vertically movable slide 50. Slide 50 is mounted for vertical movement in ball bearing assemblies 51 and 52 and is biased downwardly by spring 53 secured at one end to slide 50 and at the other end to the housing 20. The pivoted block 21 is pivotally supported on members 54 and 55 on slide 50 and is biased to nonengaging position by spring 56 connected between the block lock 21 and slide 50. Its initial position is at the bottom of the housing 20. As the slide is moved upwardly in a manner to be described the finger 57 on the block lock 21 engages a member 58 which serves as a chip shield and a cam for tripping the block lock in its uppermost position against the biasing spring 56 to cause it to move to its engaging position with the work piece to register the work piece 31 by pulling the work piece while it is floating, into an accurate position to be worked upon. The block lock carries a roller or cam follower 59 which has a function to be described later. The slide also carries a cam follower 60 which engages a cam to be described to move the slide 50 vertically.

Cam slide

The cam slide 65 is slidably mounted in bearings 66 and 67 and moves horizontally between an initial and terminal position. The slide 65 carries a cam 68 mounted on a plate 69 secured to the slide 65. The cam 68 contacts follower 60 mounted on slide 50 to move it up in its bearings 51 and 52. A second cam 70 mounted on slide 65 engages at certain times pivoted cam 71 mounted on the pivot post 72 supported from one of the housing plates 73, 74. When slide 65 is in the position shown in Fig. 7, which is substantially mid-position, the cam 71 engages a follower 59 and forces block lock 21 home into the work piece as shown in Figure 8.

A hydraulic cylinder 80 is connected by a piston 81 to the slide 65 and actuates the slide in response to certain controls. Mounted in the housing 20 are micro switches 81, 82, 83 and 84 for control purposes to be described. These are operated by cams 85, 86, 87 and 88 carried on slide 65. There is also a micro switch 89 which controls movement of slides 65 and 50 when engaged by element 89' on slide 50.

When the solenoid controlled hydraulic piston and cylinder 80 are energized to move slide 65 from its initial position to its terminal position, that is, from left to right in Figs. 2, 7, and 9, cam 68 in contact with the follower 60 moves slide 50 vertically until the indexing finger is in ready position, that is, partially rotated, at which point the slide element 89' engages micro switch 89 in housing 20 to de-energize the solenoid controlling cylinder 80, causing slide 65 to stop. When the indexing mechanism has rotated the platen to indexing position, one of two micro switches controlled by the rotating support re-energizes the solenoid controlling piston and cylinder 80 to cause continued motion of the slide 65 to terminal position sending the indexing finger home into contact with the work piece. At the same time cam 71 engages cam follower roller 59 and insures movement of block lock 21 into engagement with the work piece. As pointed out above, when the slide 65 reaches its terminal position, it contacts terminal switches 87 and 88 shutting off the air and starting the piston 80 and the slides 65 and 50 back to initial position as well as the indexing mechanism.

Controls

The controls are mounted on the indexing mechanism, the rotating support and in the housing as described above. The fluid operated pistons are connected through reversing valves which are solenoid operated to a source of fluid under pressure, in this case, a liquid such as oil.

The switches for the various circuits are shown in their initial position either open or closed. The circuits for the ratchet and pawl including mechanism and solenoid operated brake are shown in Fig. 13. This circuit will first be described.

Indexing circuit

When it is desired to start operation of the apparatus, the manually operated switch 102 is closed. (This could be controlled automatically for each indexing operation.) Solenoid 45' opens the fluid valves (not shown) to cause piston 42 attached to pawl 41 to move forward, thus rotating shaft 25 and friction wheel 85. At the same time solenoid 86' is energized to release the brake, normally biased to braked position, to permit free rotation of the shaft. As the friction wheel 85 is rotated, the roller for switch 100 in contact with plate 85' rides out of the groove 105 and closes, thus establishing a holding circuit for solenoid 45', permitting manually operated switch 102 to be released. The piston continues to move forward. When the shaft 25 and friction wheel have moved one index position, the roller of switch 100 drops into the next groove, thus opening the solenoid circuit to stop further movement of the piston rod 42. Brake solenoid 86' is also de-energized permitting the brake to return to braking position to hold the shaft 25 against rotation.

The return of the indexing mechanism is controlled by the slide 65 and switches 82 and 84. When slide 65 is in its initial position, at the left in Fig. 7, the cam 86 is in contact with the roller or follower of switch 82 and keeps it in open position. This switch is biased to close. Switch 84 at the terminal position of slide 65 is normally biased open. The switch 84 has a solenoid lock in 84'.

When slide 65 moves away from its initial position, switch 82 closes to set up the reverse circuit. When slide 65 reaches its terminal position cam 88 contacts the roller of switch 84 to close it. This completes the circuit through the switch holding solenoid 84' and the solenoid 45'' of the reversing valve (not shown) for the piston 45, returning it to its initial position. Since the brake for shaft 25 is on, and since pawl 41 slips back over ratchet wheel 36, no movement of shaft 25 or friction wheel 85 takes place. Thus, switch 100 remains open and the forward solenoid 45' is not energized.

*Slide circuit*

Figure 14:
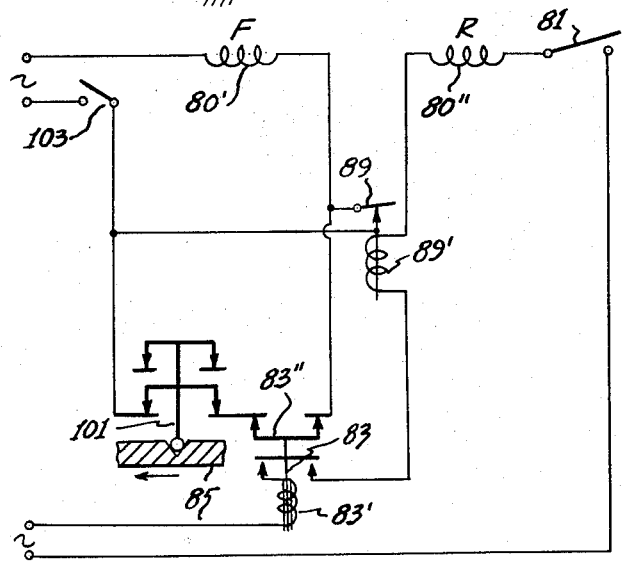

The circuit for slide 65 is shown in Fig. 14. As shown in Fig. 5, the piston rod 42 has secured to it a block 107 having attached to it an arm 106 having a cam 106'. As it moves forward, it engages switch 103, which is normally biased to open positions to close it. This completes a circuit through switch 89 mounted in housing 20 (see Fig. 9) and solenoid 80' of the control valve (not shown) to cause fluid under pressure to enter piston 80 to cause forward movement of the piston rod 81 attached to slide 65 by bracket or shaft block 65'. Since friction wheel 85 has already started rotating, the roller of switch 101 has been raised out of the groove 106 before switch 103 has been closed. Thus, the slide 65 is not moved until after switch 101 is opened.

As the slide 65 moves to its terminal position, slide 50 moves vertically until the block lock 21 is in ready position. At this point the switch cam 50' opens switch 89 which is normally biased closed. The circuit through the solenoid 80' is thus broken and the piston rod 81 and slide 65 stop.

However, the indexing mechanism at this time is still moving as is the friction wheel 85. When, however, the next index position is reached, the roller of switch 101 drops into a groove 106, completing a circuit through switches 103, 101, 83 normally biased as shown, and solenoid 80' thus causing continued forward movement of the slide 65 to its terminal position. As described above, the block lock 21 is pivoted to its work engaging position.

The switch 81 in the housing 20 is biased to close. However, with slide 65 in its initial position, the roller of switch 81 is engaged by cam 85 to hold it in open position. When slide 65 starts its forward movement, switch 81 closes to set up the reverse circuit. When slide 65 reaches its terminal position, cam 87 engages switch 83, having a solenoid 83', to close it through reverse solenoid 80''. The solenoid 83 provides an interlock so that as slide 65 moves away from its terminal position, the circuit for the reversing solenoid 80'' will remain closed. Since now the upper contacts 83'' of switch 83 have been opened, and since switch 89 is open, the forward solenoid 80' is de-energized simultaneously with energization of solenoid 80''. A holding solenoid or interlock 89' is provided to keep switch 89 open during the return movement of slide 65. The solenoid 89' is energized as long as reverse solenoid 80'' is energized. During the return movement of the slide, switch 103 is opened as the piston rod 42 of the indexing mechanism returns to its initial position. When slide 65 reaches its initial position, switch 81 is opened by cam 85 de-energizing solenoids 83', 89' and 80''. Switch 89 closes, and the upper contacts 83'' of switch 83 close again setting up the circuits for the next indexing operation.

*Air valve*

Figure 15:
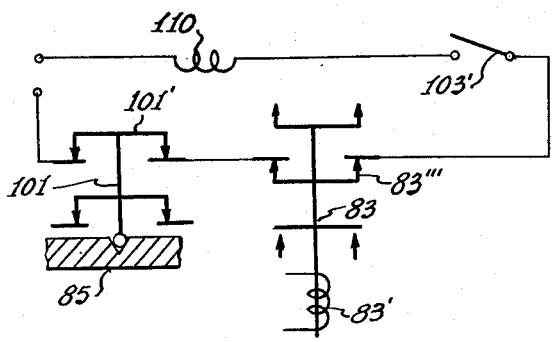

The air valve controls are shown in Fig. 15. Switch 101 is provided with a second pair of contacts 101'. Switch 83' is provided with a third set of contacts 83''' normally biased closed. The circuit is completed through a second switch arm 103' of switch 103 which is biased to open position. Switch 101' is of course opened up before 103' is closed when the roller of switch rides up out of groove 106, so that the air valve (not shown) is not operated until the proper time. When the shaft 25 is rotated to its terminal position, the roller of switch 101 drops into a groove 106 to close contacts 101'. Since 83''' is closed as is 103', the air valve is actuated at this time. This is at the instant that the block lock is in ready position and the solenoid 80' for slide 65 is energized by switch 100. Air is admitted through passage 29 in shaft 25 to be directed through the holes 31 in air release plate 30 to cause the magnetic chuck to float. The air stays on while slide 65 moves to its terminal position and block lock is pivoted into contact with the work piece. When slide 65 reaches its terminal position, cam 87 opens switch 83 and contacts 83'''. As described above, this switch is kept open by solenoid 83' until the slide 65 returns to its inital position at which time the switch 103' is open. Thus, the air valve remains de-energized during the return trip of slide 65. Switch 83 is de-energized when slide 65 returns to its initial position and contacts 83''' return to closed position. Thus, all circuits return to de-energized condition when the indexing mechanism and slide 65 return to initial position to be prepared for the next indexing operation.

It is, of course, understood that when the support and work piece have been indexed, the milling tool 22 can be swung into place for the milling operation. This can be done manually or automatically.

What is claimed is:

1. Apparatus for indexing and positioning a work piece including a rotatable support, ratchet operated mechanism for moving said support between index positions and including a first solenoid controlled fluid operated mechanism connected to said ratchet mechanism, a housing adjacent said support including a pair of slides movable in a direction normal to each other, one of said slides having a pivoted work located finger for engaging a work piece on said support and having a cam follower, the other slide carrying a cam in contact with said follower, said other slide supporting a plurality of cams, a solenoid controlled fluid operated operating mechanism connected to said other slide for moving said other slide, a control switch in the path of said first slide and connected to the second solenoid of the second fluid operated mechanism for controlling movement of said other slide, a control switch adjacent said rotatable support and connected to the second solenoid of the second fluid operated mechanism for controlling said other slide, control switches at the initial and terminal positions of said other slide and adapted to be operated by said other slide and connections to the solenoid of the first fluid operated mechanism for controlling movement of said ratchet operated mechanism and said slides in a predetermined order.

2. Apparatus for indexing and positioning a work piece including a movable support, mechanism connected to said support for moving said support between index positions and including a first solenoid controlled fluid operated mechanism, a housing adjacent said movable support, a pair of slides mounted in said housing and movable relative to each other, one of said slides supporting a movable positioning element for engaging a work piece on said movable support and having a cam follower, the other slide carrying a cam in contact with said follower, a plurality of cams on said other slide, a second solenoid controlled fluid operated mechanism for moving said other slide, a control switch in the path of said one slide connected to the solenoid of said second solenoid controlled fluid operated mechanism for controlling movement of said other slide, a control switch adjacent said movable support and connected to the solenoid of said second solenoid controlled fluid operated mechanism for controlling said other slide, other control switches at the initial and terminal positions of said other slide and adapted to be operated by the cams on said other slide, and connections between the other control switches and said solenoid controlled mechanisms for controlling movement of said support and said slides in a predetermined order.

3. Apparatus for supporting and indexing a work piece including a rotatable support, a magnetic chuck mounted on said support and movable vertically and transverely with respect to said support and having a loose connection therewith, fluid operated means connected to said chuck for suspending said chuck in a floating position, means for rotating said rotatable support to successive indexed positions, means positioned adjacent said rotatable support for contacting and accurately positioning a work piece mounted on said chuck when said chuck is in floating position, said last means comprising a first slide movable parallel to the axis of said rotatable support and having thereon a pivoted element for engaging and positioning the work piece, a second slide movable transversely of said first slide and operatively connected thereto for moving said first slide to a first position and then to work engaging position, and means connected between said rotatable support and said second slide for controlling movement of said second slide, and other means connected with said second slide for causing movement of said second slide, and means connected between said rotatable support and the fluid operated means for controlling the fluid operated means.

4. Apparatus for supporting and indexing a work piece including a movable support, a magnetic chuck mounted on said support and movable vertically with respect to said support and having a loose connection therewith, means connected to said chuck for directing air under pressure against said chuck for suspending said chuck in floating position when in an indexed position, means for moving said support to successive indexing positions, means positioned adjacent said support for contacting and accurately positioning a work piece mounted on said chuck when said chuck is in floating position, said means comprising a first slide movable transversely of the direction of movement of said movable support and having thereon a pivoted element for engaging and positioning a work piece on said chuck when said chuck is floating, a slide movable transversely of said first slide and operatively connected thereto for moving said first slide to a first position and then to work engaging position, means connected between said movable support and said second slide for controlling movement of said second slide in one direction and other means contacted by said second slide in its movement in said one direction for causing movement of said second slide in the reverse direction, and means in contact with and controlled by movement of said support for controlling the means connected to said chuck for directing air under pressure against said chuck.

5. Apparatus for supporting and indexing a work piece including a rotatable support, a magnetic chuck mounted on said support and movable vertically and transversely with respect to said support and having a loose connection therewith, fluid operated means connected to said chuck for suspending said movable chuck part in floating position, a first solenoid controlled fluid pressure operated device for rotating said rotatable support to successive indexed positions, means positioned adjacent said rotatable support for contacting and accurately positioning a work piece mounted on said chuck when said chuck is in floating position, said means comprising a first slide movable parallel to the axis of said rotatable support and having thereon a pivoted element for engaging and positioning the work piece in indexed position, a slide movable transversely of said first slide and operatively connected thereto for moving said first slide to a first position and then to work engaging position, a reversible solenoid controlled fluid pressure operated device connected to said second slide for moving said second slide, means connected between the first solenoid controlled fluid pressure device and the reversible solenoid controlled device of said second slide for controlling movement in one direction of said second slide, and other means connected to the solenoid of said second slide and contacted by said second slide for stopping movement of said second slide in said one direction, and other means connected to said reversible solenoid controlled device and controlled by said rotatable support for controlling continued movement of said second slide in said one direction.

6. Apparatus for supporting and indexing a work piece including a rotatable support, a magnetic chuck mounted on said support and movable with respect to said support and having a loose connection therewith, fluid operated means connected to said chuck for suspending said chuck in floating position, a first electrically controlled means connected to said rotatable support for rotating said rotatable support to successive indexed positions and movable from an initial to an indexed position, means positioned adjacent said rotatable support for contacting and accurately positioning a work piece mounted on said chuck when said chuck is in floating position, said last means comprising a first slide movable parallel to the axis of said rotatable support and having thereon a pivoted element for engaging and positioning the work piece, a slide movable transversely of said first slide and operatively connected thereto for moving said first slide to a first position and then to work engaging position, a second electrically controlled means connected to said second slide for controlling movement of said second slide, means on said first electrically controlled means for controlling said second electrically controlled means for controlling movement of said second slide in one direction, means connected to said second electrically controlled means and said first electrically controlled means and contacted during movement of said second slide in said one direction to cause said second slide to move in a reverse direction and to cause said means for rotating said support to return to its initial position.

7. Apparatus for supporting and indexing a work piece including a rotatable support, a magnetic chuck mounted on said support and movable vertically and horizontally with respect to said support and having a loose connection therewith, means connected to said chuck for directing air under pressure against said chuck for suspending said chuck in floating position with respect to said support, means connected to said rotatable support for rotating said rotatable support to successive indexed positions, means positioned adjacent said rotatable support for contacting and accurately positioning a work piece mounted on said chuck when said chuck member is in floating position, said means including a slide assembly having an element for engaging and positioning the work piece, means connected between said rotatable support and said slide assembly for controlling movement of said slide assembly, and other means contacted by said slide assembly during movement thereof and connected to said means for rotating said rotatable support and to said slide assembly for controlling reverse movement of said last means and said slide assembly.

8. Apparatus for supporting and indexing a work piece including a rotatable support, a magnetic chuck mounted on said support and movable vertically and horizontally with respect to said support and having a loose connection therewith, means connected to said chuck for directing air under pressure against said chuck for suspending said chuck in floating position with respect to said support, means connected to said rotatable support for rotating said rotatable support to successive indexed positions, means positioned adjacent said rotatable support for contacting and accurately positioning a work piece mounted on said chuck when said chuck member is in floating position, said means including a slide assembly having an element for engaging and positioning the work piece, means connected between said rotatable support and said slide assembly for controlling movement of said slide assembly, and other means contacted by said slide assembly during movement thereof and connected to said means for rotating said rotatable support and to said slide assembly for controlling reverse movement of said last means and said slide assembly, the means for rotating said rotatable support and for moving said slide assembly including electric solenoid controlled reversible fluid pressure operated pistons.

9. Apparatus for supporting and indexing a work piece including a movable support, a magnetic chuck mounted on said support and movable vertically with respect to said support and having a loose connection therewith, means connected to said chuck for directing air under pressure against said chuck for suspending said chuck in floating position when in an indexed position, means for moving said movable support to successive index positions, means positioned adjacent said movable support for contacting and accurately positioning a work piece mounted on said chuck when said chuck is in floating position, said means comprising a first slide movable transversely of the direction of movement of said movable support and having thereon a pivoted element for engaging and positioning a work piece on said chuck when said chuck is floating, a slide movable transversely of said first slide and operatively connected thereto for moving said first slide to a first position and then to work engaging position, means connected between said movable support and said second slide for controlling movement of said second slide in one direction and other means contacted by said second slide in its movement in said one direction for causing movement of said second slide in the reverse direction, and means in contact with and controlled by movement of said movable support for controlling the means connected to said chuck for directing air under pressure against said chuck, and means on said means for moving said support and connected to said second slide for controlling movement of said second slide in said one direction.

10. Apparatus for supporting and indexing a work piece including a rotatable support, a magnetic chuck mounted on said support and adapted to have relative movement with respect to said support and having a loose connection therewith, means connected to said chuck for directing air under pressure against said chuck for suspending said chuck in floating position, electrically controlled means for rotating said rotatable support to successive indexed positions, means positioned adjacent said rotatable support for contacting and accurately positioning a work piece mounted on said chuck when said chuck is in floating position, said means comprising an electrically controlled slide assembly having thereon a pivoted element for engaging and positioning the work piece when said chuck is floating, electrical connections to said electrically controlled means and slide assembly having switches adjacent said slide assembly, said switches being in the path of movement of said slide assembly to be contacted thereby, and means connected between said rotatable support and said slide assembly for controlling movement of said slide assembly and the means connected to said chuck for directing air thereagainst.

11. Apparatus for supporting and indexing a workpiece including machine frame means, a support movable on said frame means, index means for moving said support to successive indexed positions, workholding means mounted on said support for limited movement relative thereto and capable of fixedly relating a workpiece, means cooperating between said workholding means and said support for preventing relative movement therebetween, means for rendering said cooperating means inoperative and floating said workholding means with its related workpiece for ease of movement within said limited extent, and means on said frame for engaging said workpiece and moving said workpiece and its fixedly related floating workholding means to insure the final accurate indexed position of said workpiece with respect to said frame means.

12. Apparatus for supporting and indexing a workpiece including machine frame means, a support movable on said frame means, index means for moving said support to successive indexed positions, workholding means mounted on said support for limited movement relative thereto and capable of fixedly relating a workpiece, means cooperating between said workholding means and said support for preventing relative movement therebetween, means for rendering said cooperating means inoperative and floating said workholding means with its related workpiece for ease of movement within said limited extent, and means on said frame for engaging said workpiece and moving said workpiece and its fixedly related floating workholding means to insure the final accurate indexed position of said workpiece with respect to said frame means, and other means for rendering said cooperating means operative after said workpiece and its related floating workholding means have been moved to final accurate indexed position.

References Cited in the file of this patent

UNITED STATES PATENTS

| | | |
|---|---|---|
| 2,193,840 | Oberhoffken | Mar. 19, 1940 |
| 2,392,169 | Mansfield | Jan. 1, 1946 |
| 2,570,589 | Phillips | Oct. 9, 1951 |
| 2,708,861 | Walter | May 24, 1955 |
| 2,712,248 | Gustafson | July 5, 1955 |
| 2,787,175 | Schurger | Apr. 2, 1957 |